United States Patent [19]
Hepner et al.

[11] Patent Number: 6,118,187
[45] Date of Patent: Sep. 12, 2000

[54] METHOD FOR CONTROLLING AN OUTPUT OF AN ELECTRICAL POWER PLANT

[75] Inventors: Stephan Hepner, Althäusern; Andrew Wihler, Ennetbaden, both of Switzerland

[73] Assignee: Asea Brown Boveri AG, Baden, Switzerland

[21] Appl. No.: 08/974,822

[22] Filed: Nov. 20, 1997

[30] Foreign Application Priority Data

Feb. 7, 1997 [EP] European Pat. Off. ............... 97810072

[51] Int. Cl.$^7$ ...................................................... H02P 9/04
[52] U.S. Cl. ........................... 290/40 B; 290/52; 322/32; 322/36
[58] Field of Search ................... 290/1 A, 2, 52; 322/19, 29, 32, 36; 361/3; 307/87

[56] References Cited

U.S. PATENT DOCUMENTS

| | | | |
|---|---|---|---|
| 4,492,874 | 1/1985 | Near | 290/40 B |
| 4,593,364 | 6/1986 | Ghrist, III | 364/494 |
| 4,785,405 | 11/1988 | Hasegawa et al. | 364/480 |
| 4,952,852 | 8/1990 | Bando et al. | 318/140 |
| 5,483,147 | 1/1996 | Ilic et al. | 322/25 |
| 5,686,766 | 11/1997 | Tamecjika | 307/43 |
| 5,694,026 | 12/1997 | Blanchet | 322/29 |
| 5,751,069 | 5/1998 | Rajashekara et al. | 290/40 C |
| 5,783,932 | 7/1998 | Namba et al. | 322/16 |
| 5,886,417 | 3/1999 | Oka et al. | 290/52 |

FOREIGN PATENT DOCUMENTS 0 141 372 A1  5/1985  European Pat. Off. .
0141372     5/1985  European Pat. Off. .

OTHER PUBLICATIONS

Dr. E, Welfonder, et al., "Einsatz eines Mikrorechners zur nichtlinearen Filterung des Netzfrequenzrauschens bei der Primärregelung", Oct. 5, 1978, pp. 303–312.

European Search Report dated Jul. 10, 1997.

"Einsatz eines Mikrorechners zur nichtlinearen Filterung des Netzfrequenzrauschens bei der Primarregelung", Welfonder, et al., VDE–KONGRESS '78, Oct. 1978.

*Primary Examiner*—Nicholas Ponomarenko
*Attorney, Agent, or Firm*—Burns, Doane, Swecker & Mathis, L.L.P.

[57] ABSTRACT

A method for controlling a power plant which delivers electrical power to an electrical grid. The grid has a grid frequency which fluctuates around a nominal frequency. A power output of the power plant is controlled as a function of a control frequency, in such a manner that the power output is increased when the control frequency decreases below the nominal frequency. On the other hand the power output is decreased when the control frequency rises above the nominal frequency. The grid frequency is continuously measured. The measured grid frequency is averaged to give, as a moving average, a slowly varying averaged trend frequency which is characteristic of the long term behavior of the grid frequency. The averaged grid frequency is used as the control frequency, if the measured grid frequency lies within a predetermined band around the averaged grid frequency. The measured grid frequency is used as the control frequency, if the measured grid frequency lies outside the predetermined band.

22 Claims, 14 Drawing Sheets

Table 1:

| Class | Amplitude Range | Frequency Range | Rel. Frequency of Occurance | Effect on EOH |
|---|---|---|---|---|
| 1 | high | low | medium | very low |
| 2 | low | medium to high | high | very high |
| 3 | high | high | low | low |

FIG. 5
PRIOR ART

METHOD FOR CONTROLLING AN OUTPUT OF AN ELECTRICAL POWER PLANT

BACKGROUND OF THE INVENTION

1. Field of the Invention

The present invention relates generally to the field of electrical power plants, and specifically to methods for controlling an output of a power plant providing electrical power to a power grid to a method for controlling a power plant according to the preamble of claim 1.

2. Background Information

The deregulation of the power generation market in the past years has resulted in an increased competition among power suppliers. In particular, independent power suppliers (IPPS) are increasingly influencing the market rules. The increased competition and the high investments required to operate a power station have led to high expectations in terms of reliability and availability of power stations. In particular, countries which are now in a phase of industrial built-up, are characterized by a continuously growing power demand and, therefore, comparatively unstable grids. In such a situation, the capability of the power plants to provide frequency response is of utmost importance for sustaining a reliable grid operation. In order to make use of the demand of cheap, clean and reliable power supply for the gas turbine business, it is therefore important to enable gas turbine driven power plants to provide frequency response in grids that may experience high and fast frequency fluctuations. The recent blackout in Malaysia underscores the urgency of this requirement.

SUMMARY OF THE INVENTION

Technically, frequency response operation of a power plant can be summarized by three basic demands: The ability to 1) automatically provide a certain amount of power per given drop of the grid frequency,
2) provide this power within a given time, i.e. at a certain power gradient, and
3) provide the aforementioned capabilities in a wide range of ambient conditions and a wide range of grid frequencies.

For gas turbines the satisfaction of these demands find their limitations in terms of temperature limits, gradient limits (power and temperature), and limits of the number of load cycles that certain parts can withstand. These limits have to be pushed by constructive methods and by the gas turbine control system such that the market requirements for frequency response can be met or even surpassed. In the following, a data processing scheme for grid measurements is described that generates signals to the GT power controller such that the grid requirements with respect to dynamic GT response are satisfied, and, at the same time, the detrimental effects of this operation mode on the life time consumption of the GT are minimized.

Advantageous and expedient further development of the solution according to the invention are given in the dependent claims.

BRIEF DESCRIPTION OF THE DRAWINGS

A more complete appreciation of the invention and many of the attendant advantages thereof will be apparent upon reference to the following detailed description in connection with the accompanying drawings, wherein:

FIG. 5 shows signal classes: Definition.

DETAILED DESCRIPTION OF THE PREFERRED EMBODIMENTS

Figure 1:
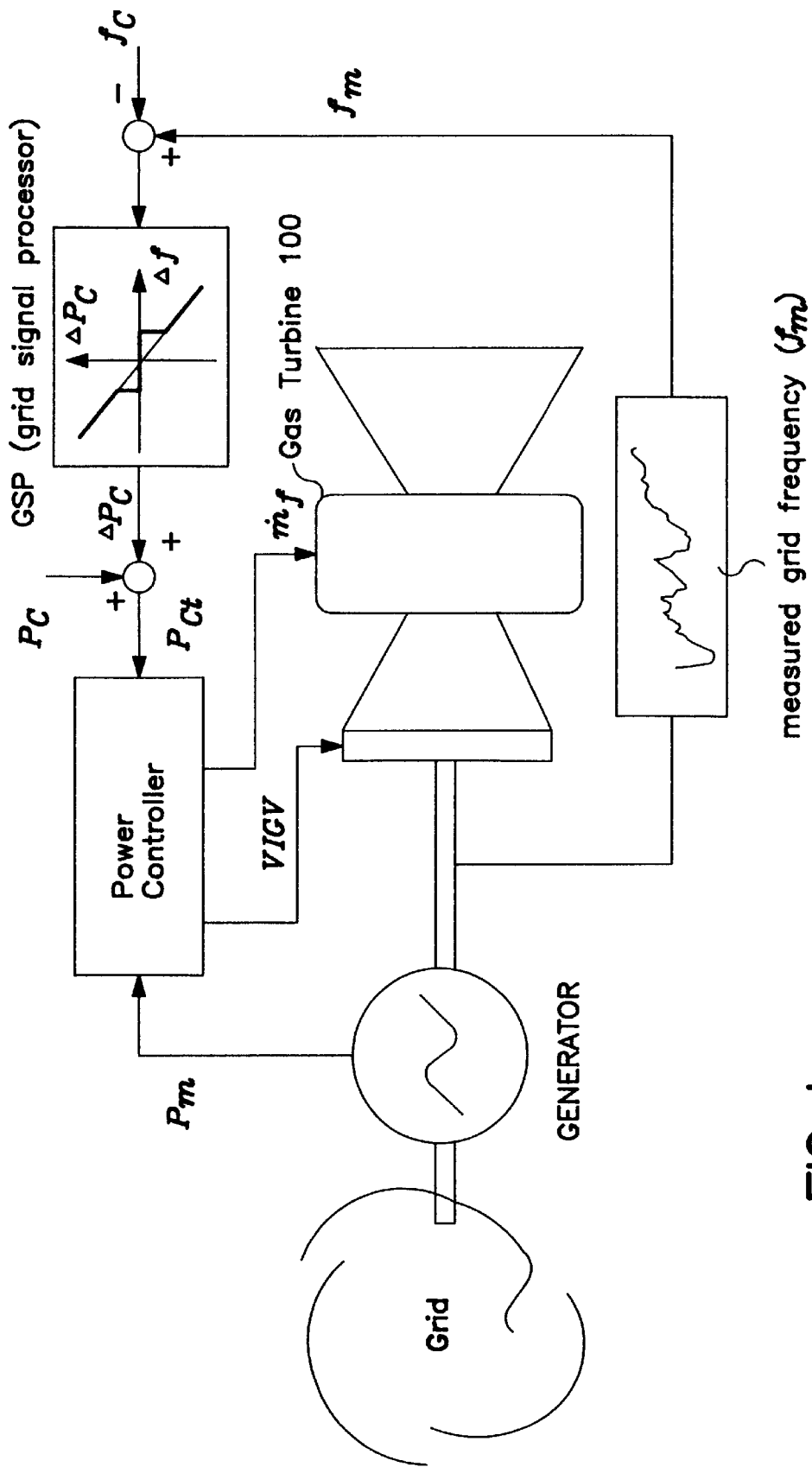
FIG. 1 shows a frequency operation mode.

Frequency operation mode of a gas turbine is characterized by the automatic variation of the set point $P_c$ of the GT power controller as a function of the frequency error $\Delta f$ according to a given (linear) characteristic, which is called the droop characteristic. The basic set-up of the control loop is depicted in FIG. 1: The measured grid frequency ($f_m$) is compared with the frequency set point ($f_c$; normally 50 Hz or 60 Hz). The resulting frequency error $$\Delta f = f_m - f_c \qquad (2.1)$$

is then converted to a demanded power signal $\Delta P_c$ based on a droop characteristic which is prescribed by the local grid code. In the following, the associated signal processing algorithms will be referred to as Grid Signal Processor (GSP, see FIG. 1). The output of the GSP is added to the power set point $P_c$ (selected by the operator) yielding the total demanded power output $P_{ct}$. This signal is subsequently forwarded to the power controller which in turn acts on the fuel mass flow ($m_f$) and/or the variable inlet guide vanes (VIGV) of the gas turbine 100 in order to adjust the measured power output $P_m$ to the total power demand $P_{ct}$. The capability of this loop to provide reliable and fast frequency response is crucially dependent on the process dynamics (GT process, measurements, actuators), the dynamic of the power controller, and the quality of the GSP.

The balance of this exposition deals with a GSP that converts the frequency signal $\Delta_f$ into an appropriate signal $\Delta P_c$ such that the grid requirements are fulfilled and such that the gas turbine is operated with a minimum effect on its life time consumption.

Definition 1 The droop characteristic is a function $\Delta P(\Delta f)$ that determines the stationary change of power output in terms of the frequency error of a power station that runs in frequency response operation.

Figure 2:
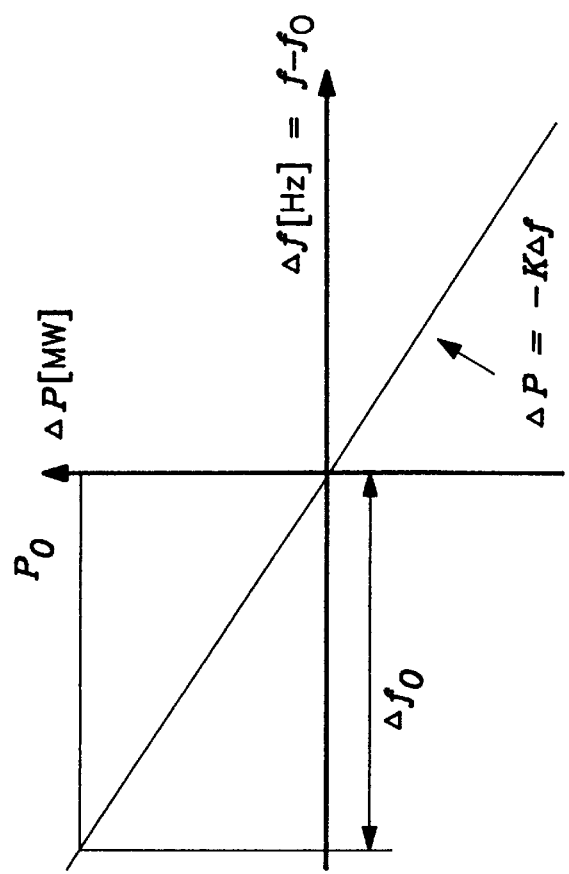
FIG. 2 shows a static characteristic.

An ideal, linear characteristic is shown in the FIG. 2.

Definition 2 The droop determines the slope of the linear, ideal characteristic shown and defined in the FIG. 2. The lower the droop the higher the slope of the droop characteristic.

Figure 3:
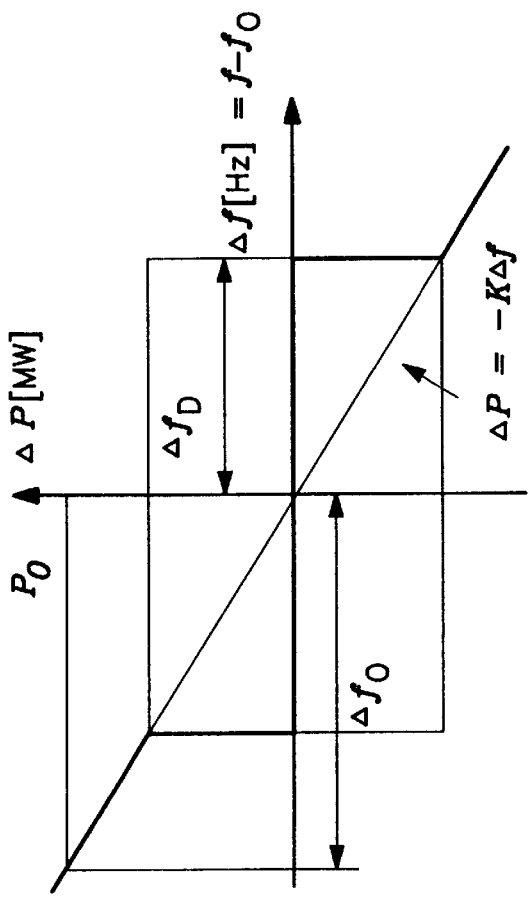
FIG. 3 shows a Dead Band-static characteristic.

The implementation of the ideal droop characteristic in power plants is not practicable because it will result in frequency response for any frequency error, in particular also for errors that are due to measurement and/or grid noise. This noise will be mapped into a noisy command signal of the plant's power controller and thus produce output noise of the plant. This is undesired for both, the plant operator and the grid operator. For the plant operator the excitation of the plant with noisy signals results in unnecessary consumption of life time. This is particularly important for a gas turbine power plant. For the grid operator noisy plant output is undesired because it increases the noise level of the grid. Notice that the grid noise is increasingly amplified the lower the droop setting of the grid is. For this reason, the ideal characteristic is modified with a dead band which is centered around the nominal frequency $f_o$. FIG. 3 shows, for example, a deadband 302. Both the droop and the dead band are assigned by the grid operator. It turns out, however, that this characteristic is unable to produce the results that it is designed for. This problem will be analyzed in the following sections, and an optimized GSP will be presented that ensures the requirements of both the grid and the plant operator.

Figure 4:
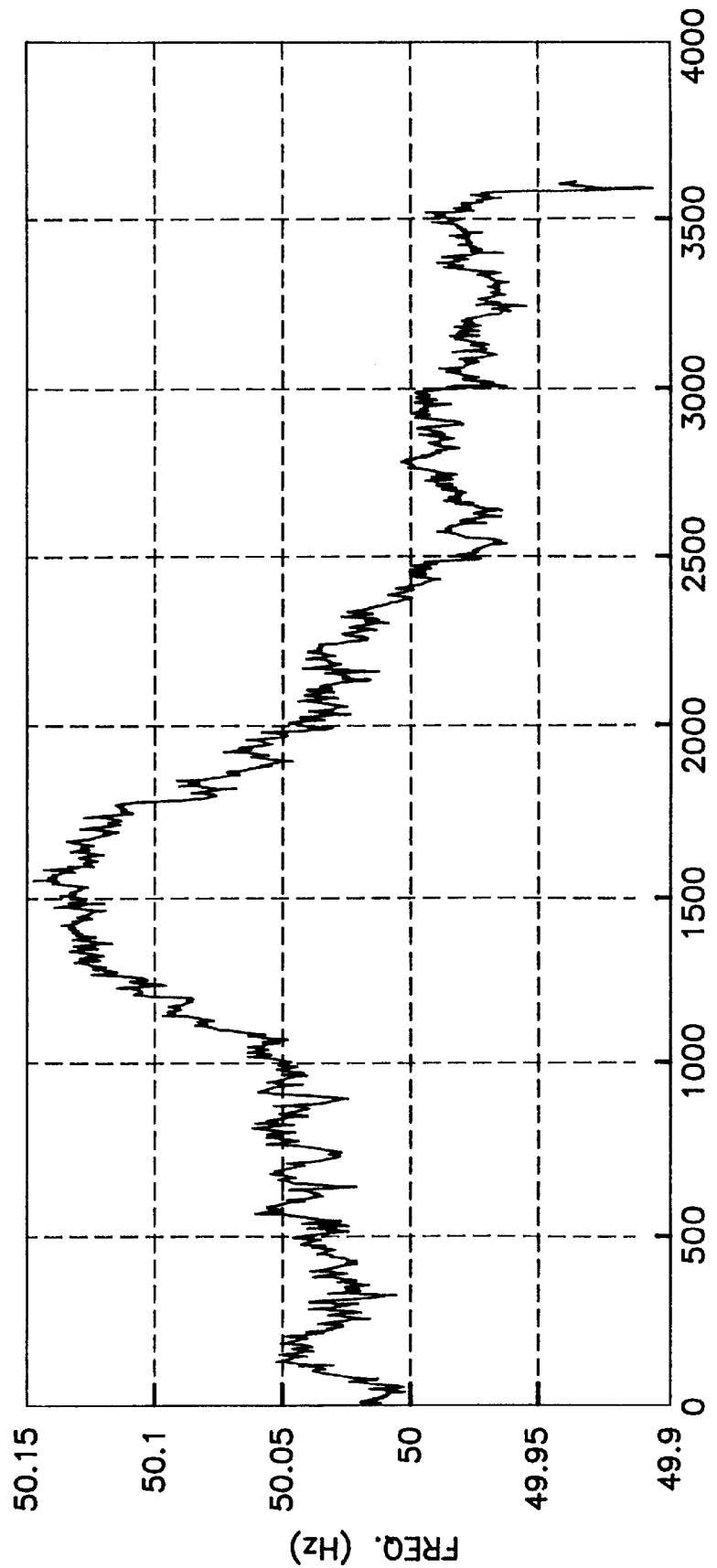
FIG. 4 shows a typical grid-development.

The basis for the optimization of the GSP for gas turbine driven power plants is an analysis of the grid dynamics. A typical trace of the British Grid is shown in FIG. 4, as an illustrative example. These data can be classified with respect to their dynamic characteristic in terms of frequencies and amplitudes with a focus on their effect on the life time of a gas turbine. The result of this analysis is summarized in FIG. 5. Essentially, the dynamic signal content of the grid can be divided into three classes of superimposed signals:

Class 1-signals describe the long-term behavior of the grid with a horizon which is of the order of magnitude of minutes (see FIG. 4). This type of motion is also referred to as trend. It is generated by fluctuations of the power consumption and by the grid self dynamics. Therefore the grid owner wants to receive frequency response for Class 1-signals. Due to their very low gradients and their restricted frequency of occurrence Class 1-signals have only a low impact on the GT life time.

Class 2-signals are low-amplitude signals in the entire frequency spectrum with an extremely high rate of occurrence (on the order of $10^5$ occurrences per year). Due to their high rate of occurrence, they have a massive impact on GT life consumption. On the other hand, they are generated basically by stochastic effects (measurement noise, grid noise) and hence are not relevant for frequency response. It is therefore in the interest of the grid owner and the plant operator to suppress frequency response for this type of signals.

Class 3-signals are characterized by a very high frequency content, high amplitudes (typically pulses or steps), and a comparatively low frequency of occurrence. These signals are generated by sudden grid events like the trip of a power plant. For the grid operator it is of utmost importance to have reliable frequency response for this type of events. Their impact of GT life consumption is relatively low since these events are very seldom compared to the other signal classes.

Figure 6:
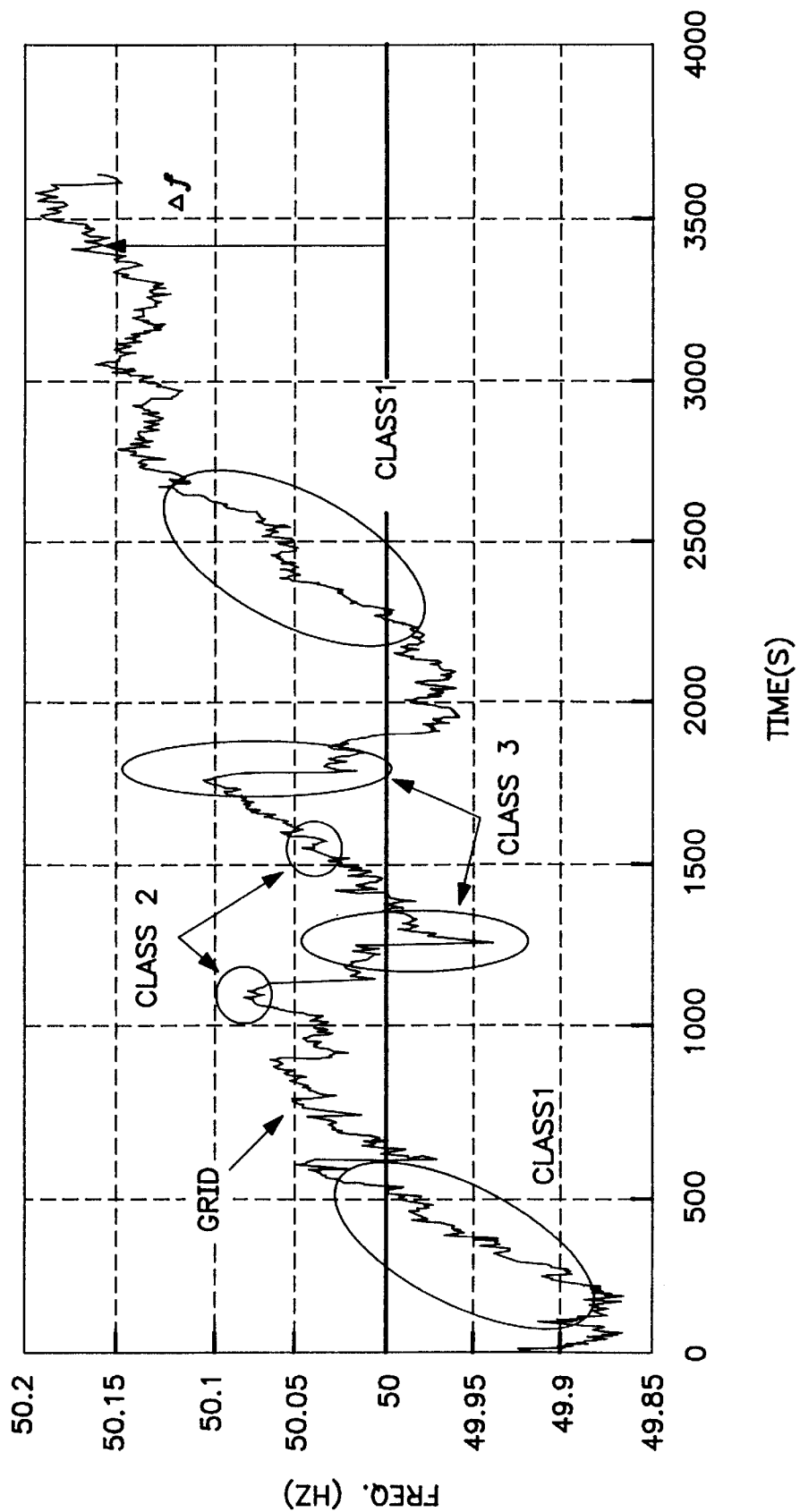
FIG. 6 shows signal classes: Example.

A typical trace showing the signal types described above is shown in FIG. 6. Based on the above analysis a GSP is constructed that provides frequency response for the signal classes 1 and 3 according to the specified droop, and suppresses frequency response for Class 3-signals. The key to the construction of such a GSP is a way to differentiate the three classes from the available frequency measurement.

Figure 7:
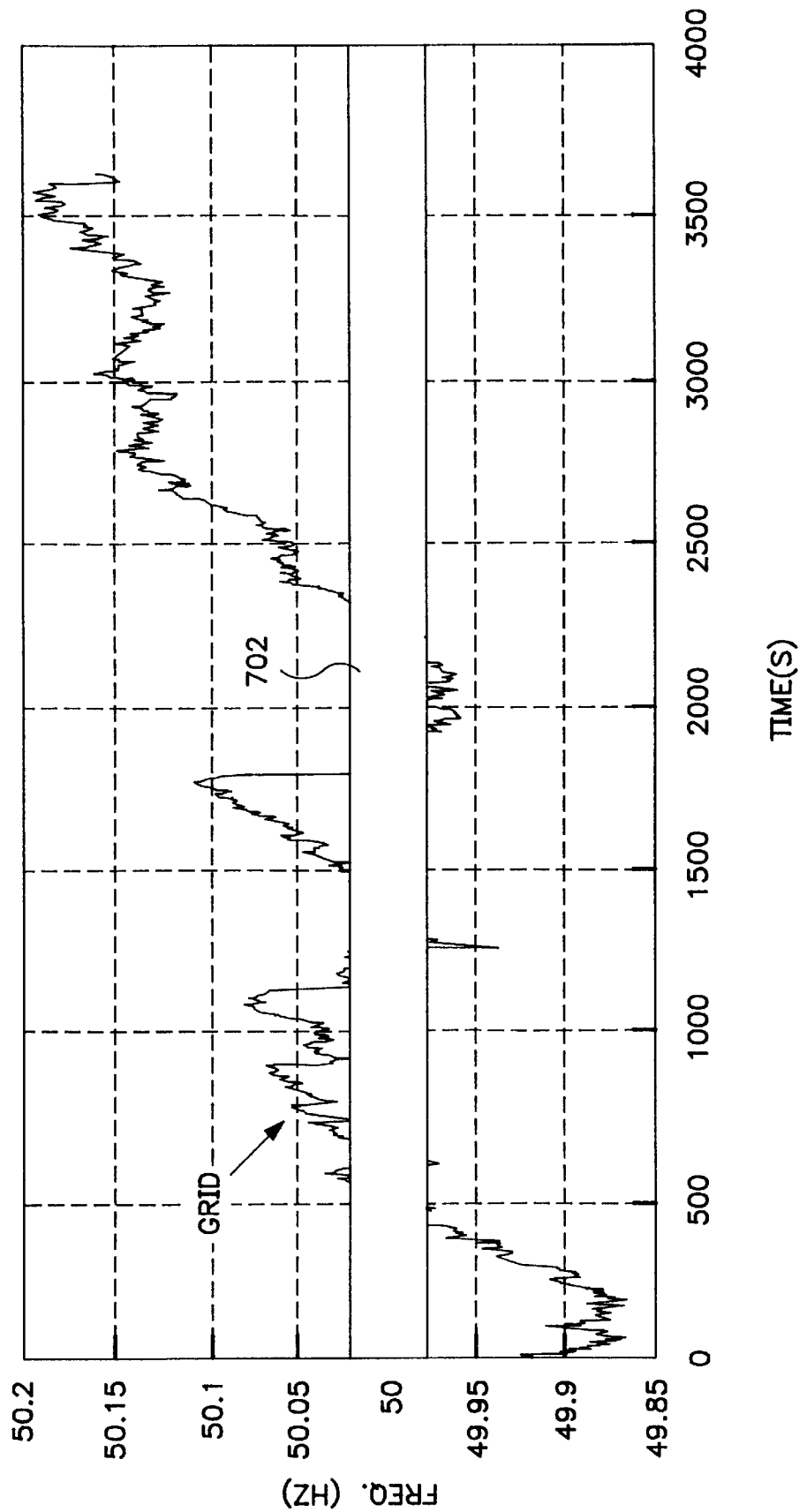
FIG. 7 shows signal classes: Static Dead Band.
Figure 10:
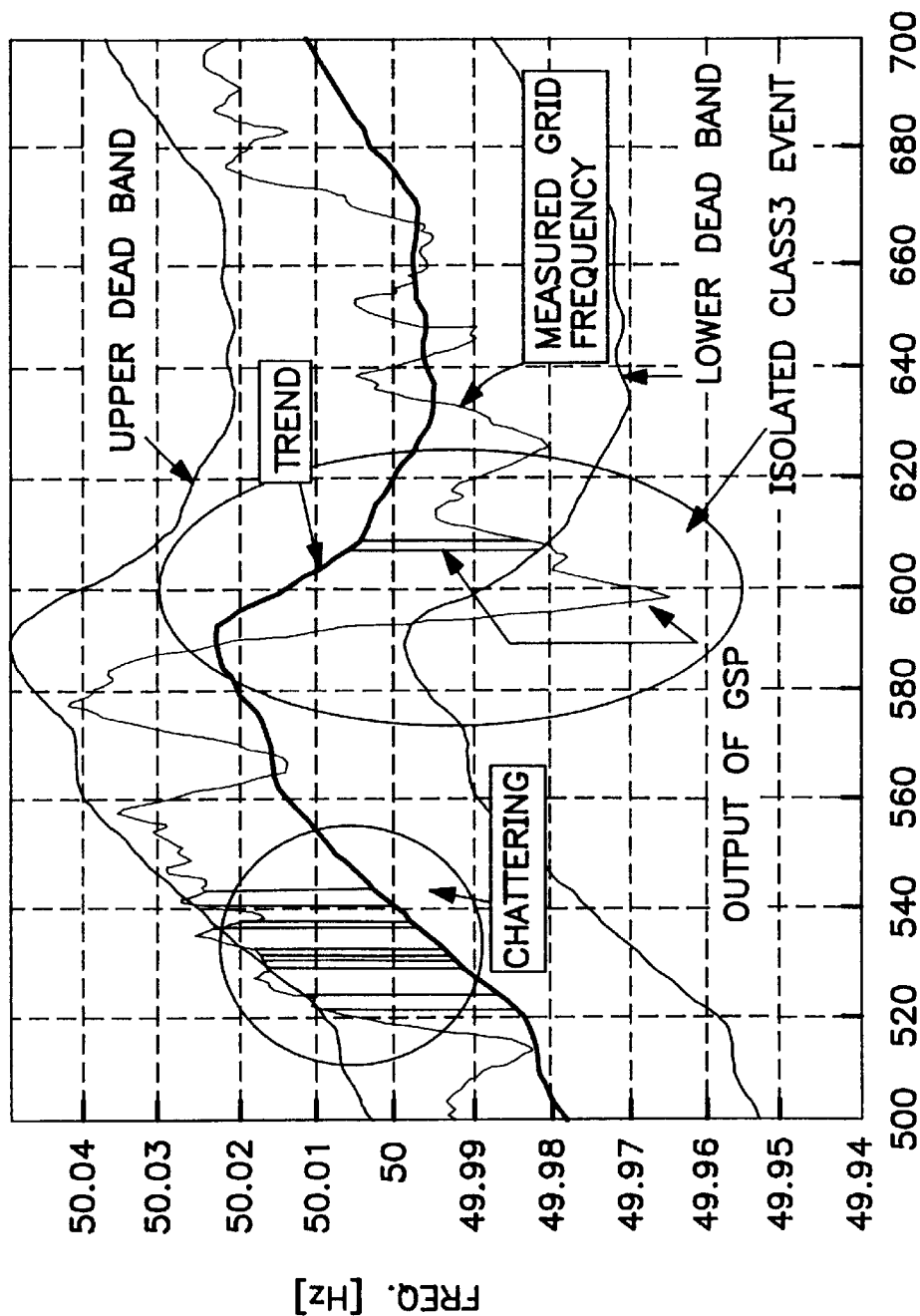
FIG. 10 shows GSP Output with constant Dynamic Dead Band.

Concept and mechanism of the Dynamic Dead band: The heart of the new GSP is the replacement of a static dead band, such as that shown in FIG. 7, with a dynamic dead band. The motivation for this becomes clear by analyzing the trace shown in FIG. 7. It is evident from FIG. 7 that the static dead band cannot discriminate the signal class 3 from the life time is the Class 3-signal and not the Class 2-signal (because of the higher amplitude of Class 3). A typical trace that is obtained with this mechanism is shown in the FIG. 10.

The Dead Band Strategies are as follows:

a) In light of the Deflation/Inflation: The trace depicted in FIG. 10 reveals a problem that arises when the measured frequency signal stays close to the dead band. In this situation there may be frequent exits and re-entries into the dead band (caused by Class 2 signals) which each time trigger a jump from the trend signal to the frequency measurement and back to the trend. This effect is called chattering. Chattering can be avoided by the use of a deflating dead band. The idea is to reduce the dead band to a very small value as soon as the measured frequency leaves the dead band. In this way chattering cannot be triggered by Class-2 signals. The dead band is inflated again as soon as the measured frequency reenters the deflated dead band. This mechanism is schematically shown in the FIG. 11 and depicted for a simple frequency trace in FIG. 12.

Figure 11:
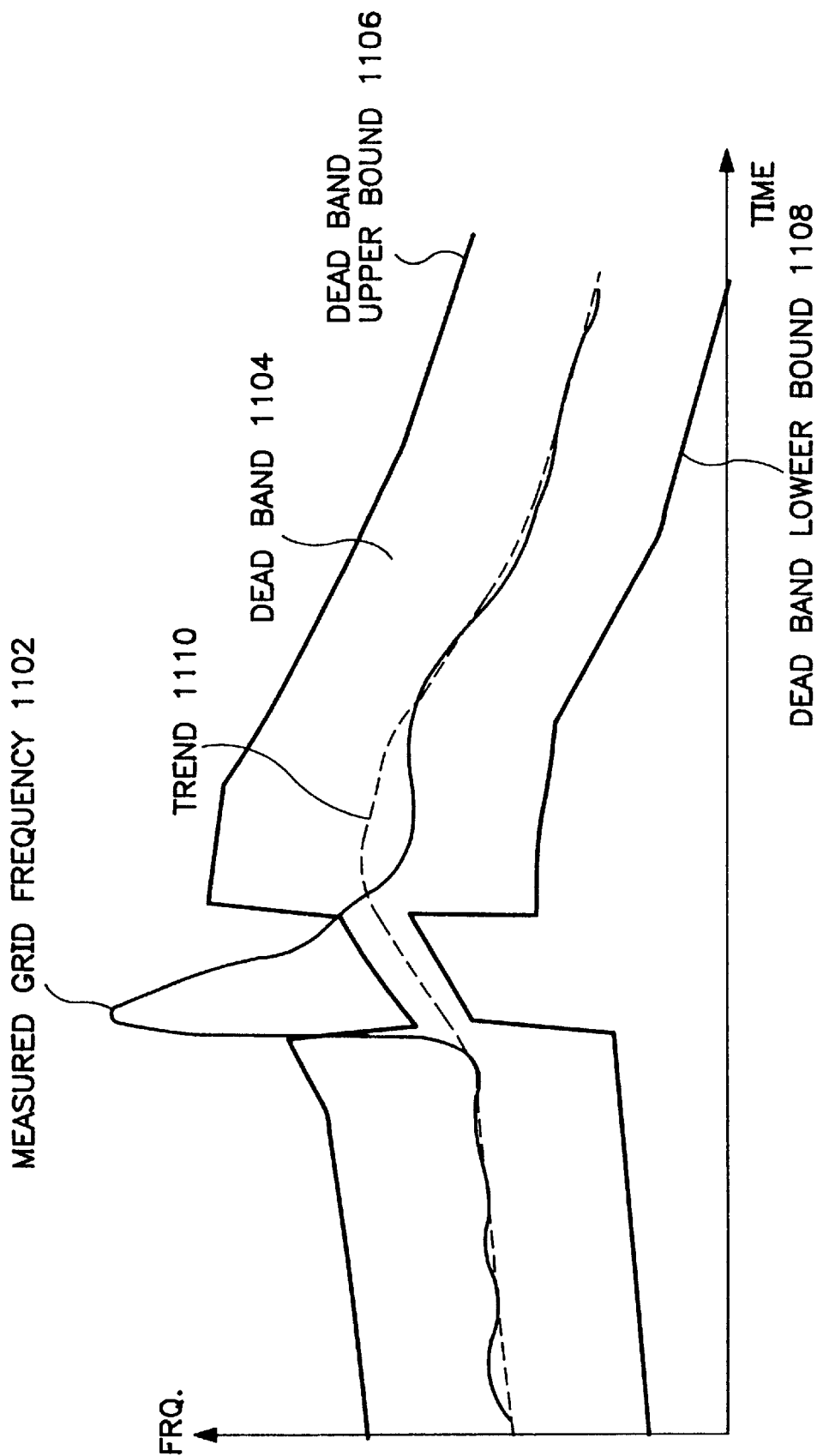
FIG. 11 shows Dead Band Deflation/Inflation.
Figure 12:
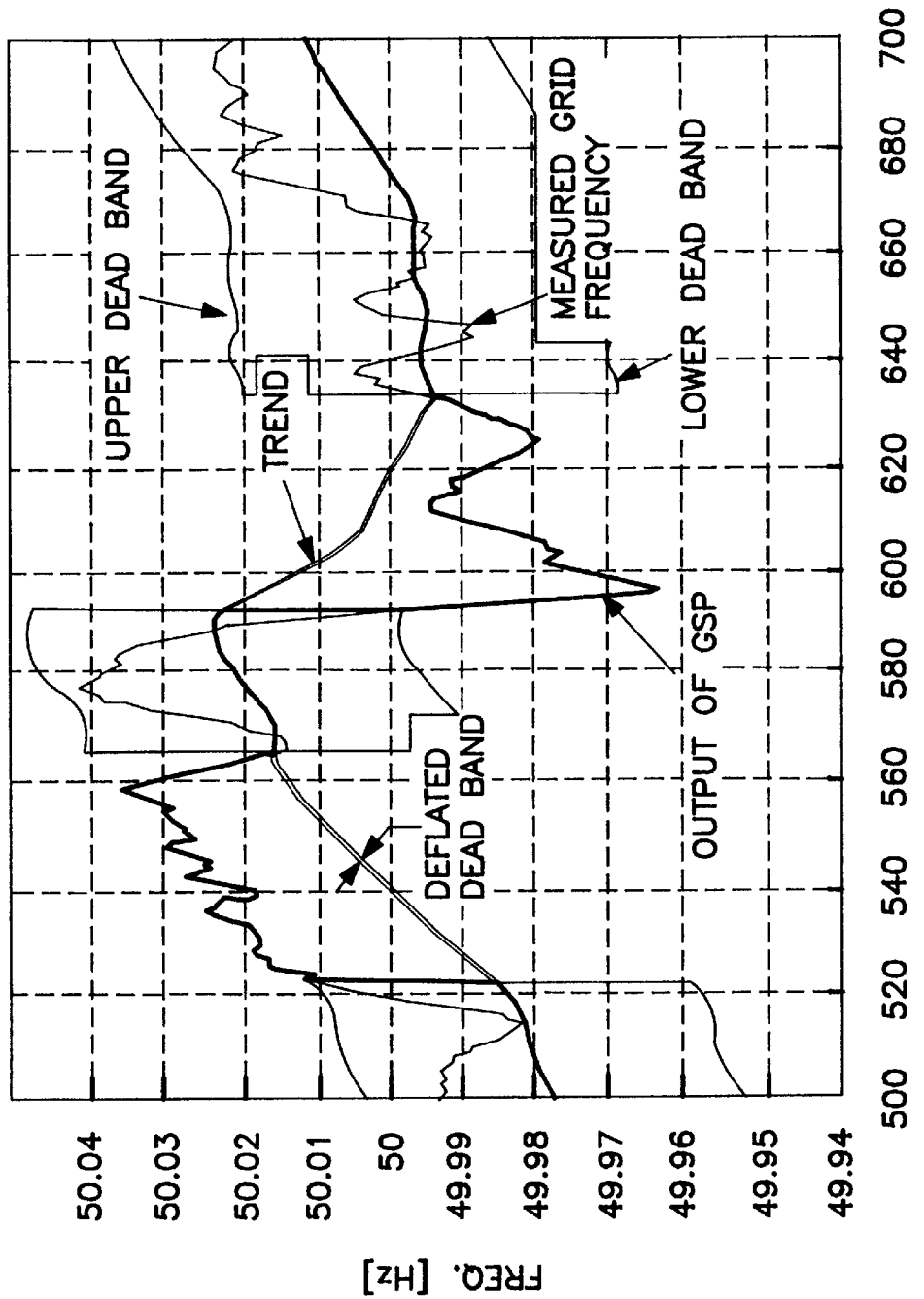
FIG. 12 shows Dead Band Inflation/Inflation.

As shown in FIG. 11, when the measured grid frequency 1102 leaves the dead band 1104, by rising above the upper bound 1106 of the dead band 1104, the bandwidth of the dead band 1104 deflates. In other words, a frequency distance between the upper bound 1106 of the dead band 1104 and the lower bound 1108 of the dead band 1104 decreases. When the measured grid frequency reenters the dead band 1104, the bandwidth of the dead band 1104 reinflates.

Figure 8:
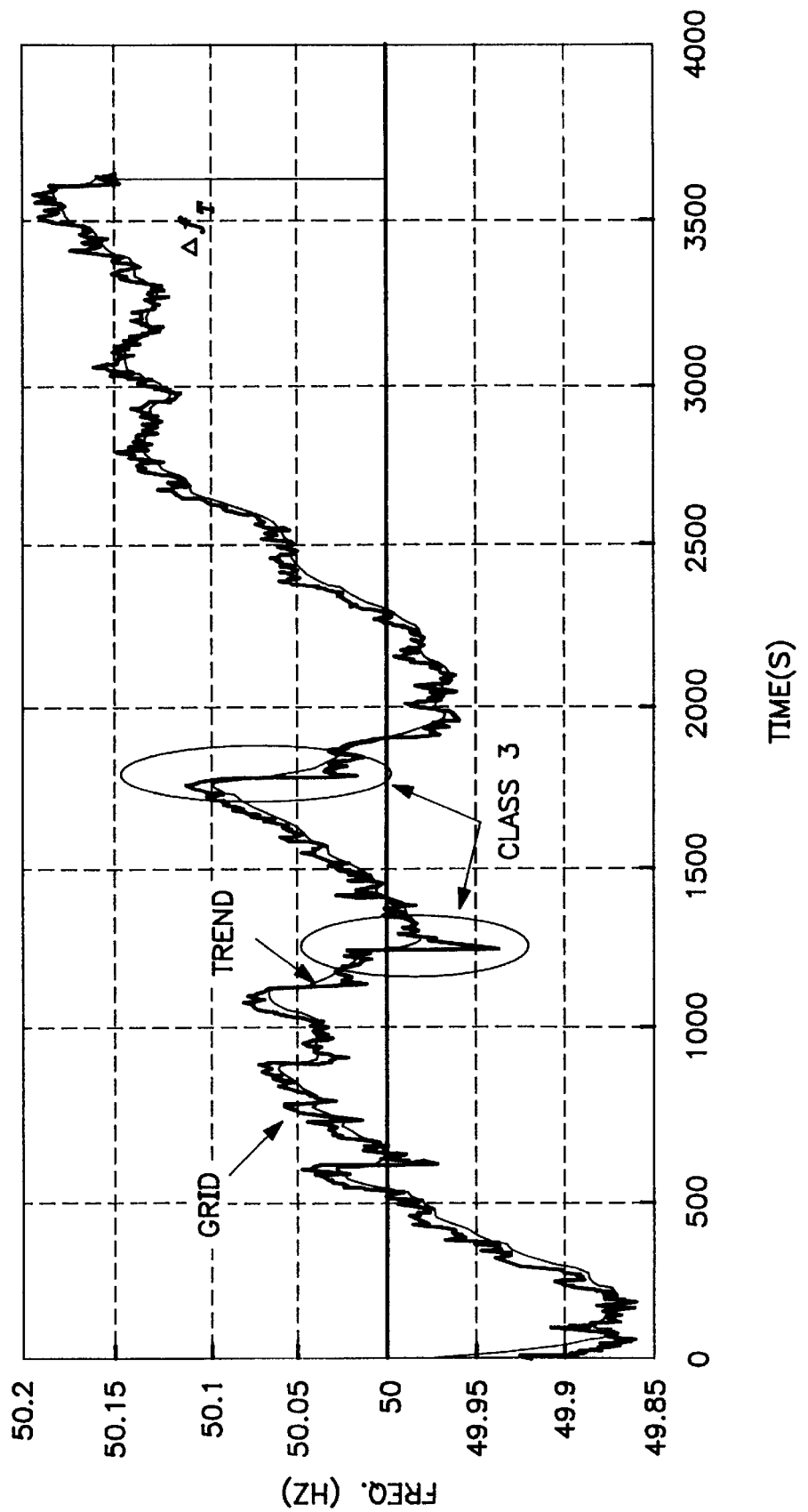
FIG. 8 shows signal classes: Trend.

As a consequence of the dead band deflation the GSP output will contain Class 2-signals until it enters the deflation dead band. This does not pose any problem to GT life time because of the relative rareness of the Class 3 events (and hence Dead Band deflation/inflation), and because of the relatively short time (and hence low number of others because the trend (Class 1-signal) resides outside the static dead band for most of the time. However, since the trend is defined as the long term behavior of the grid, it can be constructed by appropriate filtering of the grid frequency measurement (see FIG. 8) with a trend filter. Remembering that the Class 3-signals occupy the entire frequency range, it is obvious that they cannot be discriminated via dynamic filters. On the other hand, FIG. 5 and FIG. 8 suggest that they can be discriminated by their amplitude with respect to the Class 1-signals. In other words: Any small deviation from the trend is, by definition, a Class 3-signal and hence should be suppressed for frequency response. This can be easily accomplished by implementing a dead band which is centered around the trend rather than the nominal frequency $f_o$. Since the location of this band varies with the trend it is called a dynamic dead band.

Figure 9:
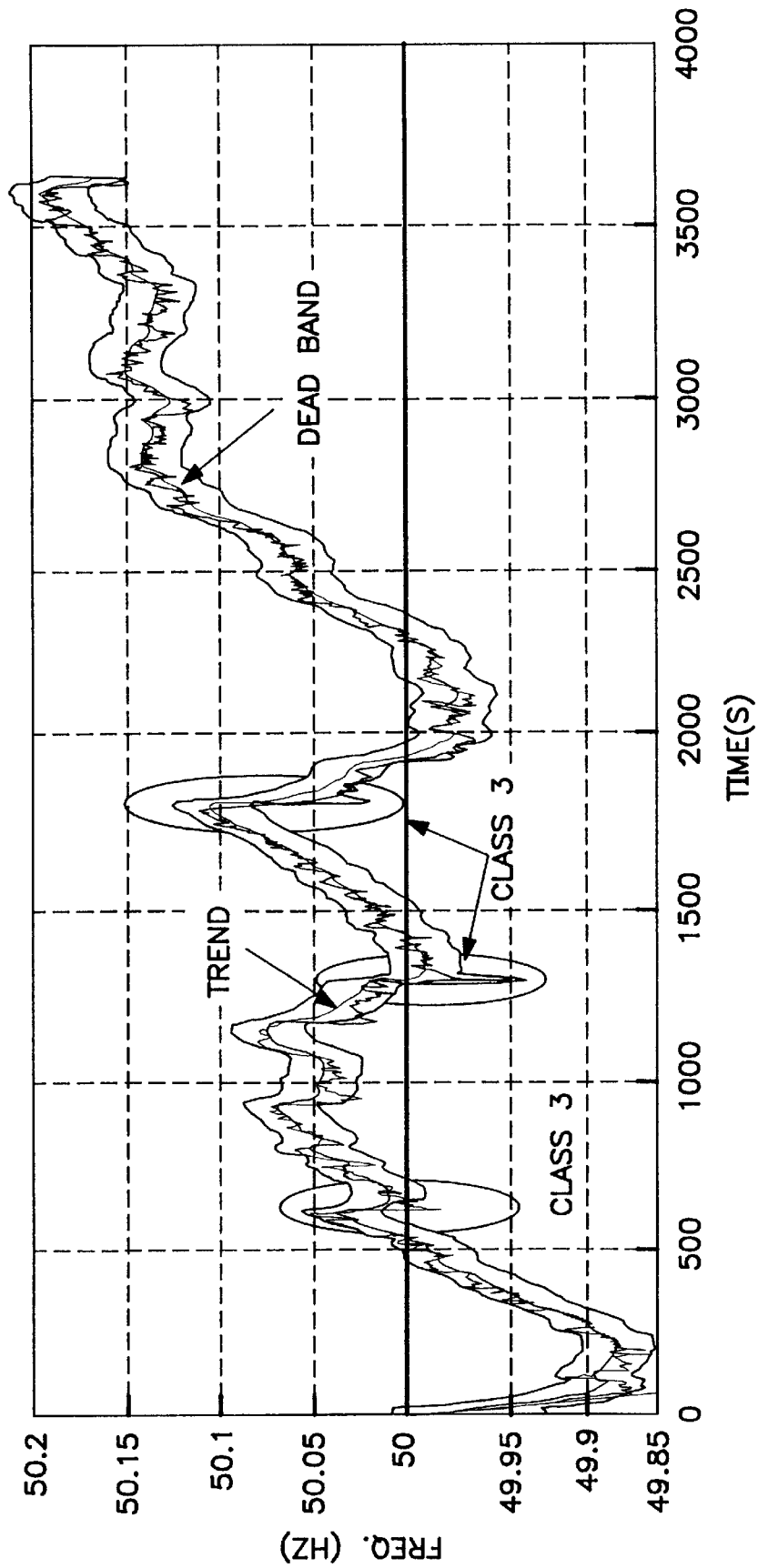
FIG. 9 shows signal classes: Dynamic Dead Band.

The trend signal together with the dynamic dead band also provides the mechanism to detect the Class 3-signals: By definition, any grid signal that leaves the dynamic dead band is a Class 3-signal (high amplitude, high frequency). The principle is illustrated in FIG. 9.

Figure 13:
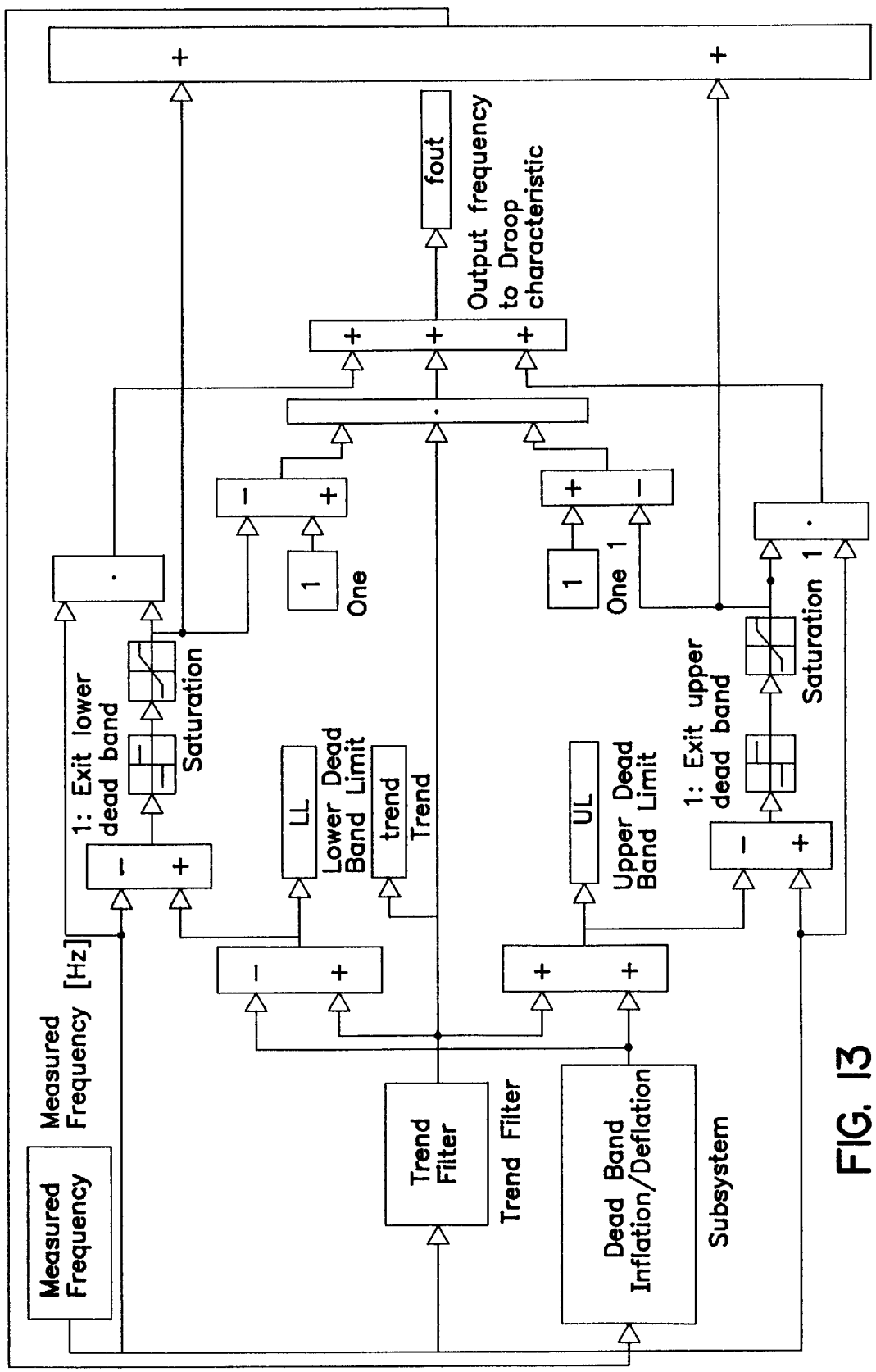
FIG. 13 shows Block Diagram of GSP.
Figure 14:
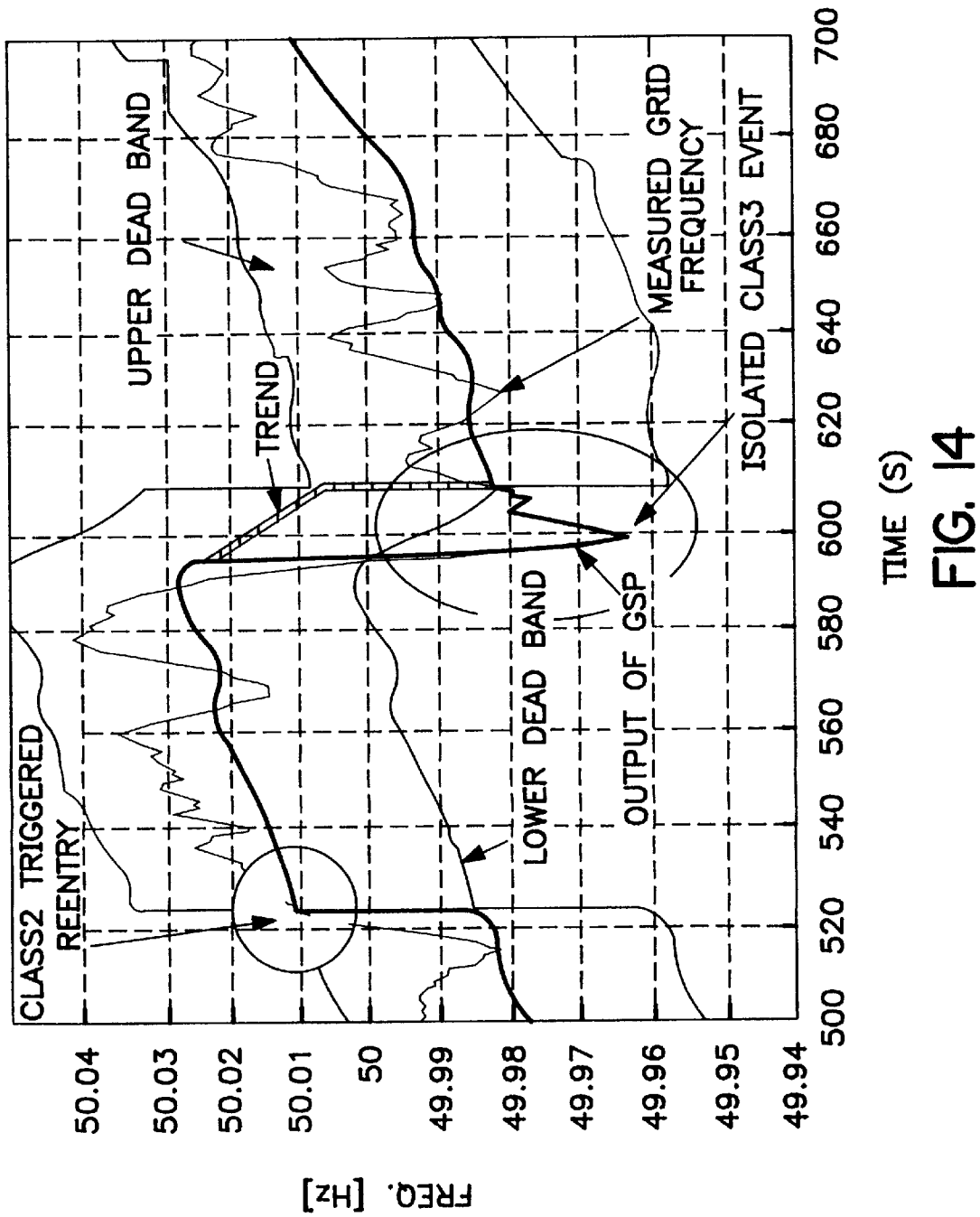
FIG. 14 shows Dead Band Shift.

The basic mechanism of operation of the GSP can now be summarized as follows: The signal that is forwarded to the ideal characteristic (FIG. 2) is the trend signal as long as the measured grid signal is within the dynamic dead band, and it is the measured grid signal for those time intervals where the grid signal leaves the dynamic dead band. In this way the frequency response is restricted to those events that are relevant to the grid and the grid noise is suppressed for most of the time. Notice that the grid noise cannot be suppressed when responding to Class 3-signals. This is, however, of no concern to the GT life time, because Class 3-events are seldom and during these events the dominant effect on Class 2 events) that is required until dead-band re-entry occurs. FIG. 13 shows the block diagram of the grid signal processing. This block diagram is understandable to a person skilled in the art.

b) In light of the Dead Band Shift: Another way to deal with the chattering problem without the necessity for Dead Band deflation is the dead band shift. With this mechanism, the trend filter is reinitialized each time the measured frequency reenters the dead band. At this point of time, the trend filter is initialized with the measured frequency at the moment of reentry. As a consequence, the dead band (which is centered around the trend) is shifted by half its total width. In this way a smooth reentry into the dead band is established for isolated Class 3-events, and chattering is eliminated in the case of reentries which are triggered by Class 2-signals. The latter is achieved because a Class 2 reentry will now result in a dead band shift that subsequently rules out any more Class 2-events with respect to the new trend. A sample trace is shown in FIG. 14.

c) In light of the prescribed Out-of-Dead Band-Time: Yet another strategy could be to prescribe the maximum time that the measured frequency may reside outside the dead band. In conjunction with the dead band shift described in the previous section, this mechanism provides the possibility of minimizing the number of Class 2-events that are passed through the droop characteristic.

We claim:

1. Method for controlling a power plant which delivers electrical power to an electrical grid, wherein the grid is an AC grid having a grid frequency which fluctuates around a nominal frequency ($f_o$), comprising the steps of:

controlling a power output of the power plant as a function of a control frequency by a) increasing the power output when the control frequency decreases below the nominal frequency ($f_o$), and b) decreasing the power output when the control frequency increases above the nominal frequency ($f_o$);

continuously measuring the grid frequency to obtain a measured grid frequency ($f_m$);

averaging the measured grid frequency ($f_m$) to give as a moving average a slowly varying averaged grid frequency which is characteristic of the long term behavior of the grid frequency;

providing a dead band around the averaged grid frequency;

using the averaged grid frequency as the control frequency when the measured grid frequency lies within the dead band; and using the measured grid frequency as the control frequency when the measured grid frequency lies outside the dead band.

2. The method of claim 1, wherein the power plant comprises a gas turbine (GT), and an output power of the gas turbine is controlled as a function of the control frequency.

3. The method of claim 1, wherein the output power is a linear function of the control frequency.

4. The method of claim 1, wherein the output power is a non-linear function of the control frequency.

5. The method of claim 1, wherein:

the dead band comprises an upper dead band and a lower dead band;

frequencies in the upper dead band are higher than frequencies in the lower dead band; and the averaged grid frequency lies between the upper and lower dead bands.

6. The method of claim 5, wherein a bandwidth of the upper dead band is equal to a bandwidth of the lower dead band.

7. The method of claim 5, wherein a bandwidth of the upper dead band is different from a bandwidth of the lower dead band.

8. The method of claim 5, wherein bandwidths of the upper and lower dead bands vary over time.

9. The method of claim 5, wherein the nominal frequency ($f_o$) is one of 50 and 60 Hz and a bandwidth of each of the upper and lower dead bands is about 0.015 Hz.

10. The method of claim 1, wherein a bandwidth of the dead band is kept constant.

11. The method of claim 10, further comprising the steps of:

whenever the measured grid frequency re-enters the dead band after having left it before, stopping the averaging of the measured grid frequency ($f_m$); and starting a new averaging process.

12. The method of claim 10, further comprising the step of:

when the measured grid frequency enters the dead band, reinitializing the averaging of the measured grid frequency ($f_m$) with the measured grid frequency.

13. The method of claim 10, further comprising the steps of:

when the measured grid frequency stays outside the dead band longer than for a predetermined maximum time, stopping the averaging of the measured grid frequency ($f_m$); and starting a new averaging process.

14. The method of claim 10, further comprising the step of:

when the measured grid frequency stays outside the dead band longer than for a predetermined maximum time, reinitializing the averaging of the measured grid frequency ($f_m$) with the measured grid frequency.

15. The method of claim 1, further comprising the steps of:

maintaining a bandwidth of the dead band at a first value while the measured grid frequency lies within the dead band;

reducing the bandwidth of the dead band to a second value that is smaller than the first value when the measured grid frequency leaves the dead band; and increasing the bandwidth of the dead band from the second value to the first value when the measured grid frequency enters the dead band.

16. The method of claim 15, wherein the first level of the bandwidth is about 0.030 Hz.

17. The method of claim 1, further comprising the steps of:

maintaining a bandwidth of the dead band at a first value while the measured grid frequency lies within the dead band; and maintaining the bandwidth of the dead band at a second value while the measured grid frequency lies outside the dead band; wherein the second value is smaller than the first value.

18. The method of claim 1, wherein the process of averaging the measured grid frequency to give the averaged grid frequency is done by a filter.

19. The method of claim 18, wherein the filter is a low pass filter.

20. The method of claim 1, wherein the dead band has a predetermined bandwidth.

21. The method of claim 1, further comprising the step of:

dynamically moving the dead band to maintain the averaged grid frequency within the dead band.

22. The method of claim 21, wherein the averaged grid frequency is maintained at a center of the dead band.

* * * * *